(12) United States Patent
Davis et al.

(10) Patent No.: US 9,982,324 B2
(45) Date of Patent: May 29, 2018

(54) RARE EARTH ELEMENT COMPOSITIONS OBTAINED FROM PARTICULATE MATERIAL COMPRISING KAOLIN AND METHODS FOR OBTAINING SUCH COMPOSITIONS

(71) Applicant: IMERYS PIGMENTS, INC., Roswell, GA (US)

(72) Inventors: Jondahl Davis, Sandersville, GA (US); Robert J. Pruett, Milledgeville, GA (US)

(73) Assignee: Imerys USA, Inc., Roswell, GA (US)

( * ) Notice: Subject to any disclaimer, the term of this patent is extended or adjusted under 35 U.S.C. 154(b) by 573 days.

(21) Appl. No.: 14/399,642

(22) PCT Filed: Mar. 15, 2013

(86) PCT No.: PCT/US2013/032220
§ 371 (c)(1),
(2) Date: Nov. 7, 2014

(87) PCT Pub. No.: WO2013/169387
PCT Pub. Date: Nov. 14, 2013

(65) Prior Publication Data
US 2015/0176105 A1    Jun. 25, 2015

Related U.S. Application Data

(60) Provisional application No. 61/645,237, filed on May 10, 2012.

(51) Int. Cl.
*C22B 59/00*    (2006.01)
*B03D 3/06*    (2006.01)
(Continued)

(52) U.S. Cl.
CPC .............. *C22B 59/00* (2013.01); *B01D 21/01* (2013.01); *B03D 3/06* (2013.01); *C01F 17/0006* (2013.01);
(Continued)

(58) Field of Classification Search
None
See application file for complete search history.

(56) References Cited

U.S. PATENT DOCUMENTS 3,539,003 A    11/1970    Bidwell
6,200,377 B1    3/2001    Basilio et al.
(Continued)

FOREIGN PATENT DOCUMENTS

WO    WO 2004/071989 A1    8/2004
WO    WO 2005/113687 A1    12/2005
WO    WO 2013/169387 A1    11/2013

OTHER PUBLICATIONS

International Search Report and Written Opinion dated May 24, 2013, in PCT International Application No. PCT/US2013/032220, filed Mar. 15, 2013.
(Continued)

*Primary Examiner* — Melissa S Swain
(74) *Attorney, Agent, or Firm* — Finnegan, Henderson, Farabow, Garrett & Dunner LLP

(57) ABSTRACT

A method for obtaining rare earth element compositions may include providing a dispersed aqueous suspension of a particulate material including at least one rare earth element compound and kaolinite. The method may further include adding to the suspension a selective flocculation polymer that facilitates separation of at least a portion of the at least one rare earth element compound from the kaolinite by flocculating the kaolinite and allowing particles of the rare earth element compound to be or remain deflocculated. The
(Continued)

method may also include allowing the suspension containing the polymer to separate in a selective flocculation separator into layers including a flocculated product layer and a deflocculated layer containing the portion of the at least one rare earth element compound. The method may further include extracting each of the separated layers from the separator. The rare earth element compound may include $La_2O_3$, $CeO_2$, $Nd_2O_3$, or $Y_2O_3$.

18 Claims, 1 Drawing Sheet

(51) Int. Cl.
    *C01F 17/00*     (2006.01)
    *B01D 21/01*     (2006.01)
    *C04B 35/50*     (2006.01)
    *C22B 3/22*     (2006.01)

(52) U.S. Cl.
    CPC ............... *C04B 35/50* (2013.01); *C22B 3/22* (2013.01); *Y10T 428/2982* (2015.01)

(56) References Cited

U.S. PATENT DOCUMENTS

| | | |
|---|---|---|
| 6,615,987 B1 | 9/2003 | Greenhill et al. |
| 7,253,128 B2 | 8/2007 | Rosenflanz et al. |
| 2006/0131243 A1 | 6/2006 | Garska et al. |
| 2008/0115627 A1 | 5/2008 | Wang et al. |

OTHER PUBLICATIONS

Office Action, European Patent Office, Application No. 13 788 010.0-1362, dated Jun. 8, 2017 (7 pages).

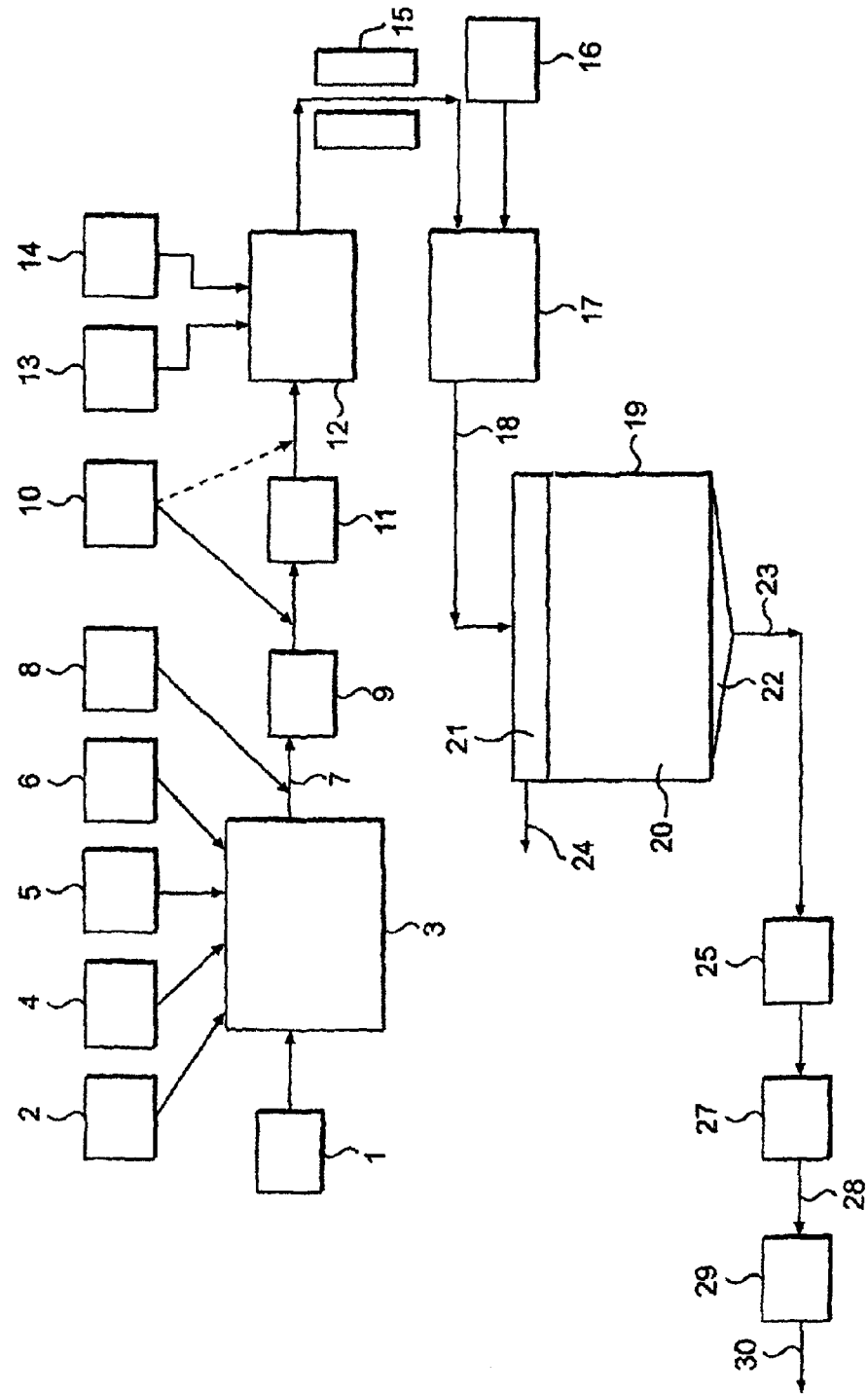

RARE EARTH ELEMENT COMPOSITIONS OBTAINED FROM PARTICULATE MATERIAL COMPRISING KAOLIN AND METHODS FOR OBTAINING SUCH COMPOSITIONS

CLAIM OF PRIORITY/INCORPORATION BY REFERENCE

This application is a U.S. national stage entry under 35 U.S.C. § 371 from PCT International Application No. PCT/US2013/032220, filed Mar. 15, 2013, which claims priority to and the benefit of the filing date of U.S. Provisional Application No. 61/645,237, filed May 10, 2012, to both of which this application claims the benefit of priority, and the entirety of the subject matter of both of which is incorporated herein by reference.

FIELD OF THE DESCRIPTION

This description relates to rare earth element compositions obtained from particulate compositions comprising kaolinite and methods for obtaining rare earth element compositions from particulate materials comprising kaolinite.

BACKGROUND

Kaolin or kaolinitic clay is a clay containing rock comprised of kaolin minerals that is white or nearly white, or can be beneficiated to be white or nearly white. Such clays were formed by the weathering or hydrothermal alteration of the feldspar and mica mineral components contained in feldspathic rocks such as granite and gneiss. Primary kaolin clays are those found in deposits at the site at which they were formed, and they generally contain with the kaolin minerals some unaltered mica and possibly feldspar, and stable minerals such as quartz, which must be separated from the clay during the refining process for the clay products. For example, primary kaolin deposits are mined and processed in places such as southwest England, France, Germany, Spain, and the Czech Republic. Sedimentary kaolin, which are alternatively known as secondary kaolin, are those which contain sediments eroded from a feldspathic source rock and deposited in fluvial or marginal marine environments such as those associated with deltas. For example kaolin clays mined and processed from deposits in Georgia, South Carolina, and Alabama, in the United States, and from deposits in Para state of Brazil are generally of the sedimentary type. Sedimentary clays deposited in different geological eras can also be used, such as tertiary or cretaceous clays.

Rare earth elements include the fifteen lanthanides, scandium, and yttrium (i.e., corresponding to the elements associated with atomic numbers 57-71, 21, and 39, respectively). Rare earth elements, although relatively plentiful in the earth's crust, are typically dispersed and not found in concentrated quantities or economically exploitable forms in most crustal rocks. Exceptions include igneous rocks such as the carbonatites located at Mountain Pass, Calif.; peralkaline syenites and granites located at Pajarito Mountain, N. Mex.; and monazite-apatite veins hosted in granite near Crescent Peak, Nev. The largest rare earth deposit in the World is at Bayan Obo in Inner Mongolia, China. The rare earth at Bayan Obo is recovered as a byproduct of iron production from a variety of magnetite-bearing rock types. Rare earth elements are concentrated in specific accessory minerals associated with the ore. Some of the minerals that can contain rare earth elements are apatite, bastnasite, florencite, monazite, xenotime. Bastnasite is a lanthanide carbonate. Apatite, monazite, and xenotime are phosphates. Florencite and a variety of lesser known rare earth containing minerals are hydrated aluminum phosphates. The phosphate-bearing minerals resist chemical attack from weathering, and they can be found in sedimentary deposits. Some marine heavy mineral sand deposits that contain monazite and xenotime which can be economically separated are at Eneabba, Australia; and other heavy mineral beach sand deposits mined and processed as byproducts in Brazil, India, Malaysia, Thailand, China, Taiwan, United States, New Zealand, Sri Lanka, Indonesia, Zaire, and Korea. Some kaolinitic claystone (sedimentary kaolin) deposits contain trace concentrations of hydrated aluminum phosphates, but no commercially developed sedimentary kaolin deposits are known to produce rare earth concentrates.

The processes used for separation of minerals containing rare earth elements from deposits is specific to each occurrence. The surface or underground mining of a rare earth ore from hard rock such as a carbonatite or granite typically requires mineral liberation by crushing and grinding the ore prior to beneficiation. Flotation is used at Mountain Pass, Calif. to concentrate liberated bastnasite particles from an ore containing about 5 wt. % REO (rare earth oxide) to a form a concentrate containing about 60 wt. % REO. Placer sand deposits containing grains of monazite and xenotime may use gravity separation equipment such as jigs, spiral classifiers, and hydrocyclones to separate discrete sand particles of heavy minerals from light minerals based on their different specific gravity. The heavy minerals from gravity separation are then fed to a magnetic separator to remove magnetic minerals, an electrostatic separator to remove titania minerals, and a final magnetic separation state to separate zircon. The rare earth mineral concentrate produced from a variety of geological environments is then fed to a process that extracts the REE (rare earth elements) by dissolution in hot concentrated acid or alkaline leaching. Further chemical fractionation to separate specific rare earth elements occurs after the leaching stage.

Rare earth elements are a valuable commodity due to their numerous uses in modern devices and processes. For example, rare earth elements are often used in batteries, compact fluorescent lights, aerospace components, flat panel displays, high-temperature superconductors, lasers, polishing compounds, catalysts, water purification devices, compact speakers, and electronic devices, among other devices and methods. Thus, although concentrated deposits of rare earth elements are rare, the demand for rare earth elements is increasing. As a result, it would be desirable to identify new economically-viable ways to concentrate useful quantities of rare earth elements from sources in which the rare earth elements are disseminated in REO-bearing minerals having a low bulk concentration in the rock. For example, because rare earth elements may be found as a component in minerals disseminated at low bulk concentrations in rocks having high concentrations of kaolinite, it would be desirable to develop an economically-viable way to separate rare earth element compositions from material containing kaolinite, such as kaolin.

In addition to rare earth element compositions, kaolin also often includes a number of substances considered to be impurities, particularly when the kaolin is refined for use as an ingredient, pigment, or filler material in a variety of application compositions, such as, for example, filling and coating of paper, paper board, and similar products. For example, kaolinite is a white mineral and is often used in such application compositions to impart, amongst other things, whiteness and brightness. However, one or more desirable properties of the kaolin may be adversely affected by the presence of impurities. Typical impurities may include, but are not limited to, titania-bearing minerals such as anatase and rutile, quartz, mica, phosphates, smectite, and other silicate, oxide and hydroxide compounds containing transition elements such as iron and chromium, and heavy metals such as lead and thorium. Thus, it would be desirable to develop a method of treating kaolin or other kaolinite-containing compositions in such a way that not only are rare earth element compositions separated from the material containing kaolinite, but other impurities are also separated from the kaolin or kaolinite-containing compositions.

SUMMARY

In accordance with a first aspect, a method for obtaining rare earth element compositions may include providing a dispersed aqueous suspension of a particulate material including at least one rare earth element compound and kaolinite. The method may further include adding to the suspension a selective flocculation polymer that facilitates separation of at least a portion of the at least one rare earth element compound from the kaolinite by flocculating the kaolinite and allowing particles of the rare earth element compound to be or remain deflocculated. The method may also include allowing the suspension containing the polymer to separate in a selective flocculation separator into layers including a flocculated product layer and a deflocculated layer containing the portion of the at least one rare earth element compound. The method may further include extracting each of the separated layers from the separator.

According to another aspect, the deflocculated layer may be an overflow layer. According to a further aspect, the portion of the at least one rare earth element compound may include particles having an equivalent spherical diameter of less than 325 microns. For example, the rare earth element compound particles may be a portion of the deflocculated layer, and the rare earth element compound particles may float to the upper layer of the separated layers. According to yet a further aspect, the specific gravity of the deflocculated layer containing the portion of the at least one rare earth element compound may range from about 1.0005 to about 1.03. According to another aspect, the kaolinite may be included in the flocculated layer, and the flocculated layer may be in the lower layer of the separated layers.

According to yet another aspect, the selective flocculation polymer may include a high molecular weight polymer. For example, the selective flocculation polymer may include a weakly anionic organic polymer having a molecular weight greater than about 100,000. For example, the selective flocculation polymer may include an acrylamide containing anionic units, the anionic units including not more than about 15% by weight of the polymer. According to a further aspect, the total amount of the selective flocculation polymer added may range from about 0.01% to about 0.5% on a dry weight basis based on the dry weight of the particulate material.

According to still a further aspect, the particulate material may be obtained from kaolin. For example, the particulate material may be obtained from primary kaolin and/or secondary kaolin. According to a further aspect, providing the dispersed aqueous suspension of the particulate material may include adding water and dispersing agent to an inherently moist, crude kaolin.

According to another aspect, the rare earth element compound may include rare earth element particle-bearing compounds. The at least one rare earth element compound may include particles having an equivalent spherical diameter of less than about 325 microns.

According to still another aspect, the rare earth element compound may include $La_2O_3$ from greater than 0% by weight to about 8.0% by weight, from about 0.1% by weight to about 5.0% by weight, or from 0.2% by weight to about 4.0% by weight. The rare earth element compound may include $CeO_2$ from greater than 0% by weight to about 5.0% by weight, from about 0.1% by weight to about 4.5% by weight, or from 0.3% by weight to about 4.0% by weight. The rare earth element compound may include $Nd_2O_3$ from greater than 0% by weight to about 2.0% by weight, from about 0.1% by weight to about 1.5% by weight, or from 0.2% by weight to about 1.0% by weight. The rare earth element compound may include $Y_2O_3$ from greater than 0% by weight to about 0.2% by weight, from about 0.001% by weight to about 0.2% by weight, or from 0.01% by weight to about 0.2% by weight.

According to another aspect, the deflocculated layer may include up to about 8.0% by weight of $La_2O_3$, up to about 4.0% by weight of $CeO_2$, up to about 1.0% by weight of $Nd_2O_3$, and up to about 0.2% by weight of $Y_2O_3$. According to another aspect, the deflocculated layer may include up to about 4.0% by weight of $La_2O_3$, up to about 4.0% by weight of $CeO_2$, up to about 1.0% by weight of $Nd_2O_3$, and up to about 0.1% by weight of $Y_2O_3$.

According to yet another aspect, the method may further include conditioning the suspension prior to adding the selective flocculation polymer thereto by allowing the suspension to age for a period of at least thirty minutes. According to a further aspect, the method may include adjusting the pH of the suspension to be at least about 6.5 prior to allowing the suspension to age. According to yet another aspect, the method may further include adding a conditioning chemical prior to or during the aging. According to another aspect, the method further includes adding sodium salt to the suspension after providing the dispersed aqueous suspension. According to a further aspect, the method may further include mechanically agitating the suspension during the aging.

According to still a further aspect, the method may further include adjusting the pH of the suspension to be at least about 8 prior to adding the selective flocculation polymer. For example, the method may include adjusting the pH of the suspension to be at least about 9.8, to at least about 10.2, for example, such that the pH ranges between about 10.2 and about 12.5 prior to adding the selective flocculation polymer.

According to yet another aspect, the method may further include deagglomerating the dispersed aqueous suspension by a mechanical working process. For example, the deagglomerating may include blunging or some type of high shear liquid working.

According to still a further aspect, the dispersed aqueous suspension may have a solids content of at least about 30% by weight. According to another aspect, the method may further include adding water to the separated layers prior to extracting the separated layers from the separator, so that the solids content of the layers ranges from about 5% to about 15% by weight.

According to a further aspect, the method may further include heating the dispersed aqueous suspension prior to adding the selective flocculation polymer.

Additional objects and advantages of the invention will be set forth in part in the description which follows, and may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawing, which is incorporated in and constitutes a part of this specification, illustrates an exemplary embodiment of the invention and together with the description, serves to explain principles of the invention.

BRIEF DESCRIPTION OF THE DRAWING

FIG. 1 is a diagrammatic flow diagram showing an exemplary method of obtaining rare earth element compounds.

DESCRIPTION OF EXEMPLARY EMBODIMENTS

We have found surprisingly and beneficially that rare earth element compositions may be obtained from particulate material containing kaolinite by the exemplary methods disclosed herein. For example, rare earth element compositions may be obtained from kaolin by the exemplary methods disclosed herein.

According to some embodiments, a method for obtaining rare earth element compositions includes providing a dispersed aqueous suspension of a particulate material including at least one rare earth element compound and kaolinite. The exemplary method further includes adding to the suspension a selective flocculation polymer that facilitates separation of at least a portion of the at least one rare earth element compound from the kaolinite by flocculating the kaolinite and allowing particles of the rare earth element compound to be or remain deflocculated. The exemplary method also includes allowing the suspension containing the polymer to separate in a selective flocculation separator into layers including a flocculated product layer and a deflocculated layer containing the portion of the at least one rare earth element compound. The exemplary method further includes extracting each of the separated layers from the separator.

According to some embodiments, the deflocculated layer is an overflow layer, in particular, an upper layer of the separated layers. For example, the rare earth element compound particles are a portion of the deflocculated layer, and the rare earth element compound particles surprisingly float to the upper layer of the separated layers. In some embodiments, the kaolinite may be included in the flocculated layer, and the flocculated layer may be in the lower layer of the separated layers.

According to some embodiments, the particulate material may be obtained from kaolin. For example, the particulate material may be obtained from primary kaolin and/or secondary kaolin. According to some embodiments, providing the dispersed aqueous suspension of the particulate material may include adding water and dispersing agent to an inherently moist, crude kaolin.

According to some embodiments, the method includes conditioning the aqueous suspension by ageing, for example, together with the addition of a conditioning chemical, which may be present during part or all of the ageing, prior to raising the pH, for example, to a pH of at least 9.5, during selective flocculation, which may occur following addition of the selective flocculation polymer.

According to some embodiments, adjustment of pH to a value of at least about 8, for example, from about 10.5 to about 12.5, is carried out prior to addition of the selective flocculation polymer. For example, the pH may be adjusted to be at least about 9.5, for example, from about 10.5 to about 12.5, for example, from about 10.5 to about 11.5, before, during, and/or after conditioning the aqueous suspension. According to some embodiments, the pH during conditioning of the aqueous suspension may be in the range of from about 6 to about 9.5, for example, from about 6.5 to about 7. It is believed by the inventors that the benefit of increasing the pH, for example, in conjunction with conditioning, for selective flocculation of a particulate material including rare earth element compounds and kaolinite especially aimed at separation and removal in a deflocculated form of rare earth element compounds has not previously been recognized.

According to some embodiments, undesirable impurities such as, for example, one or more of titania, mica, feldspar, silicates such as quartz, clay mineral impurities such as smectites and other kandites, phosphates and metal oxides of, for example, iron and other transition metals, may be separated from the kaolinite by embodiments of the methods disclosed herein. Such methods may be used alone or in conjunction with one or more other known beneficiation processes.

According to some embodiments, the amount of undesirable impurities, especially fine impurities having a mean particle size of, for example, less than about 1 micron or in many cases less than about 0.5 micron, if present in the treated particulate material (e.g., kaolin clay), may be significantly reduced. Another potential benefit of some embodiments of the method described herein is that it may permit avoidance of expensive froth flotation purification processes often employed in beneficiation of, for example, kaolin.

Another possible benefit of some embodiments of the method described herein is that it may permit reduction of titania-containing and fine undesirable impurities in the particulate material (e.g. kaolin clay) to levels such that other conventional treatment processes, which may beneficially be used in treatment of the particulate material, may be applied more effectively. A further possible benefit of some embodiments of the method is that the method may be applied at one of various stages of a multi-stage beneficiation process. For example, some embodiments of the method may be applied before other beneficiation stages, such as one or more of oxidation, comminution (e.g., grinding), particle size classification (e.g., centrifugation), magnetic separation, and bleaching. As a result, the particulate material (e.g., containing kaolinite) employed in some embodiments of the method may include crude kaolin, which, apart from an optional degritting step applied before or during the method, need not be subject to any other particle separation or beneficiation steps until after treatment by the treatment method, for example, after extraction of the separated layers from the separator.

A further possible benefit is that the fineness and purity of the particulate material treated by the method are not critical, which may further distinguish embodiments of the described method from other treatment methods. For example, a kaolin treated by the method may include a crude kaolin ore having a kaolinite content of greater than 5%, such as greater than 10%, greater than 20%, greater than 30%, greater than 40%, greater than 50%, greater than 60%, greater than 70%, greater than 80%, or even greater than 90%. In another example, a kaolin treated by the method may include a crude kaolin ore having a kaolinite content of less than 90 wt. % (e.g., in the range of from 5 wt. % to 90 wt. %, from 5% to 70%, or from 50% to 90%), although kaolin ore and degritted slurries having a kaolinite content greater than 70 wt. % may also be more favorably treated by the method.

According to some embodiments, the method described herein may be operated as a batch-, semi-continuous-, or continuous-process.

According to some embodiments, the starting material for the method may include substantially dry, crude kaolin clay. The starting material may be treated by adding water and dispersant thereto to produce the dispersed aqueous suspension of particulate material. According to some embodiments, mechanical working (e.g., by blunging) is applied to the aqueous suspension of particulate material, whereby agglomerates present in the particulate material are broken down by the working process. The working process may be carried out before a conditioning step and may be applied during treatment of the starting material with water and dispersant. Addition of dispersant and application of working may be applied together, for example, in a batch-, semi-continuous-, or continuous-process.

Suitable dispersants for the particles of the suspension include the anionic dispersants employed in a deflocculation/selective flocculation separation process. For example, the dispersant may include an inorganic agent, such as, for example, an alkali metal silicate (e.g., sodium silicate or potassium silicate), or a condensed phosphate salt, such as, for example, sodium hexametaphosphate or sodium pyrophosphate. Alternatively, or in addition, the dispersant may include an organic agent, such as, for example, a lignosulfonate (e.g., sodium lignosulfonate) or a polycarboxylate (e.g., a polyacrylate such as a sodium polyacrylate).

According to some embodiments, a suitable dispersant composition for addition to the aqueous suspension during treatment of the aqueous suspension with water and dispersant includes an inorganic agent (e.g., a condensed phosphate salt), and a polycarboxylate (e.g., a polyacrylate, of low molecular weight (e.g., a weight average molecular weight of less than 20,000)) added during the treatment with water and dispersant or later (e.g., when the conditioning chemical is added following mechanical working). The expression "polyacrylate" in this disclosure includes copolymers of acrylic acid with other monomers (e.g., maleic acid or methacrylic acid). In such copolymers, the acrylic acid units may provide at least 50% of the polymer by weight. In such a dispersant composition, the weight ratio (on a dry weight or "active" basis) of inorganic agent to polycarboxylate may for example be x:1, where x is greater than 1. In such a ratio, x may be at least 2.0 (e.g., 2.0 to 5.0). According to some embodiments, the inorganic agent of the dispersant composition may include sodium hexametaphosphate, and the polycarboxylate may include sodium polyacrylate.

According to some embodiments, the dispersed aqueous suspension is treated by the mechanical working process at a particle solids concentration of at least about 30%, at least about 40%, at least about 50%, at least about 60%, or about 70% or more by weight. A work input of at least about 5 kJ/kg, for example, at least about 15 kJ/kg (e.g., from about 20 kJ/ to about 400 kJ/kg), may be applied during the mechanical working process.

According to some embodiments, after providing the dispersed aqueous suspension of particulate material, including any mechanical working applied, the suspension may be diluted and/or degritted to remove large particles that may still be present in the aqueous suspension.

According to some embodiments, the pH of the aqueous suspension may be adjusted prior to conditioning. For example, the pH of the aqueous suspension may be adjusted to be about 6 or more (e.g., from about 6.5 to about 9.5, for example, from about 6.5 to about 7.5). According to some embodiments, the pH may be adjusted prior to conditioning the suspension and again following conditioning to a still higher value. Any pH adjustment may be carried out by adding one or more suitable basic substances, for example, selected from alkali metal hydroxides and carbonates and ammonium hydroxides and carbonates, such as, for example, sodium hydroxide, potassium hydroxide, sodium carbonate or ammonium hydroxide.

According to some embodiments, the exemplary conditioning by ageing of the method may be carried out for a period of at least about 30 minutes, for example, at least about two hours, prior to the addition of the selective flocculation polymer. According to some embodiments, ageing is performed for a period of at least about five hours (e.g., at least about eight to about 24 hours, for example, for a period of about one to seven days) prior to addition of the selective flocculation polymer.

According to some embodiments, the conditioning may include ageing and addition of a conditioning chemical, and the conditioning chemical may be added prior to ageing. According to some embodiments, the conditioning chemical may be added after some or all of the ageing. The conditioning chemical may include, for example, one or more salts of a monovalent ion metal (e.g., one or more sodium salts). The sodium salt(s) may include an organic salt, such as, for example, a salt of a polycarboxylate, or a halide, such as sodium chloride. The polycarboxylate may be sodium polyacrylate. Sodium polyacrylate, where employed, may be one of commercially available products employed as mineral dispersants. The conditioning chemical(s) optionally added may be added to the aqueous suspension via one or more static in-line mixers. Alternatively, the conditioning chemical(s) may be added to the aqueous suspension in one or more conventional mixers using mechanical agitation means to promote good mixing.

According to some embodiments, during the conditioning by ageing, if the suspension contains one or more conditioning chemicals, the suspension may be mechanically agitated, for example, by stirring or recirculation. Such agitation may be relatively light and may be applied continuously, semi-continuously, or intermittently.

According to some embodiments, the selective flocculation polymer may be mixed with the aqueous suspension prior to delivery of the mixture to the selective flocculation separator. For example, these two ingredients may be thoroughly mixed together prior to delivery to the separator. The selective flocculation polymer may be added via one or more static in-line mixers. Alternatively, the selective flocculation polymer may be added to the aqueous suspension in one or more conventional mixers using conventional mechanical agitation means to promote good mixing. According to some embodiments, the selective flocculation polymer may be added in one or more doses at one or more addition points prior to delivery of the suspension to the separator.

According to some embodiments, the feed aqueous suspension to be delivered to the selective flocculation separator may have a specific gravity in the range of from about 1.03 to about 1.15. The solids content of the suspension may be in the range of from about 5% to about 21% by weight (e.g., from about 10% to about 15% by weight). Dilution with water may be carried out before the delivery to the separator, for example, before addition of the selective flocculation polymer.

According to some embodiments, the feed aqueous suspension to be delivered to the selective flocculation separator may be heated, for example, by the use of hot water in a water dilution stage and/or by passage of the suspension through an external heater (e.g., a heating jacket of a heat exchanger) to raise the temperature by at least about 10° C., for example, from about 15 to 20° C. to about 30 to 35° C. or more.

The selective flocculation polymer may be one of the selective flocculation polymers previously known or used in the art. For example, the organic polymers useful as the selective flocculation polymer include water-soluble weakly anionic organic polyelectrolytes having an average molecular weight greater than about 10,000, greater than about 100,000, or greater than about 1,000,000. Weakly anionic polymers may contain both anionic and non-ionic groups. Anionic properties may be imparted to synthetic non-ionic organic polymers, for example, by the presence of side chains of anionic groups, such as carboxylic acid, carboxylic anhydride, and carboxylic acid salt groups. Non-ionic groups in a side chain in the polymer may also be present, resulting from the presence of certain hydrophilic groups, for example, one or more of the following hydrophilic groups: carboxylic acid amide, carboxy alkyl ester, pyrrolidone, hydroxy, hydroxy alkyl ether, and alkoxy. High molecular-weight, weakly anionic synthetic polymers such as polyacrylamides containing some replacement of amide groups by carboxylic groups are suitable (e.g., replacement of from about 1% to about 20% by weight of amide groups, from about 1% to about 15% by weight of amide groups, or from about 1% to about 10% by weight amide groups). Such polyelectrolytes may be prepared by copolymerization of the non-ionic monomer(s) (e.g., acrylamide), and one or more suitable carboxylic acids (e.g., acrylic acid), or by the partial hydrolysis of non-ionic polymer(s) (e.g., polyacrylamide). According to some embodiments, the concentration of the selective flocculation polymer upon separation of the layers in the selective flocculation separator may range from about 0.001% to about 0.5%, for example, from about 0.05% to about 0.5%, by weight based on the dry weight of particulate material present.

According to some embodiments, the specific gravity of the deflocculated aqueous layer (e.g., an overflow layer containing rare earth element compound(s) and/or impurities) resulting from embodiments of the method may be at least about 1.0005, for example, ranging from about 1.0005 to about 1.02. In other embodiments, the deflocculated aqueous layer may have a specific gravity ranging from about 1.001 to about 1.01. In still other embodiments, the deflocculated aqueous layer may have a specific gravity ranging from about 1.001 to about 1.003. Adjustment of the specific gravity may be made by adjusting the dose of the selective flocculation polymer added to the suspension being treated.

According to some embodiments, following formation of the layers, the layer of deflocculated rare earth element compound(s) and/or impurities may be separated from the layer of flocculated particles (e.g., kaolinite particles) by conventional means, for example, by elutriation, decanting, and/or siphoning using batch operation or via a continuous separator. The extracted flocculated suspension may be further treated in a known manner, for example, by optional high shear pumping or mixing to break up the flocs, followed by one or more further beneficiation processes, such, as for example, one or more of oxidation, comminution (e.g., grinding), particle size classification (e.g., screening and/or centrifugation), magnetic separation, bleaching, washing, and dewatering (e.g., spray drying).

According to some embodiments of the method, prior to or during further processing, the extracted unflocculated (overflow) suspension may be further treated in an additional selective flocculation step to provide further separation of rare earth element compound(s) from kaolinite. For example, the extracted unflocculated suspension obtained may be treated by repeating one or more of the steps previously applied prior to addition of the selective flocculation polymer. According to some embodiments, additional selective flocculation polymer, which may be the same as or different from the selective flocculation polymer used in the initial selective flocculation process, may be added at an appropriate stage. Thereafter, the extracted flocculated suspension is again allowed to separate in a selective flocculation separator, and the respective layers formed are subsequently extracted as in the earlier selective flocculation and extraction steps.

According to some embodiments, the flocculated suspension (e.g., containing kaolinite) may be treated to break down the flocs therein, and thereafter, may be treated with an oxidizing agent to oxidize residual polymers and other oxidizable impurities present in the flocculated suspension following the selective flocculation process(es). The oxidizing agent may include, for example, ozone applied to the separated kaolin product suspension in a conventional ozonizer (e.g., in gaseous form bubbled into the suspension).

According to some embodiments, the separated and extracted deflocculated layer (e.g., containing rare earth element compound(s) and/or impurities) may be further treated to recover, purify, and/or use ingredients therein. In addition, water in the material may be separated by dewatering and may be purified and recycled for re-use in other processes, such as those described herein or others.

According to certain embodiments, the rare earth element compounds obtained from the method described above may comprise constituents of or isomorphous substitutions within anatase, augelite, berlinite, beryllonite, boehmite, brookite, cacoxenite, crandallite, diaspore, ernstite, eylettersite, ferrisicklerite, florencite, fourmarierite, gibbsite, gorceixite, goyazite, graftonite, hinsdalite, jagowerite, lithiophilite, olympite, orpheite, monetite, monazite, muscovite, parsonite, phosphophyllite, plumbogummite, pseudomalachite, pseudorutile, pyromorphite, rutile, saleeite, serrabrancaite, sicklerite, simferite, smrkovecite, svanbergite, uramphite, viseite, wavellite, waylandite, weinebeneite, woodhouseite, zairite, compounds containing lanthanum, compounds containing cerium, compounds containing Yttrium, compounds containing praseodymium, compounds containing neodymium, compounds containing chromium, compounds containing zirconium, compounds containing niobium, compounds containing lead, compounds containing thorium, compounds containing strontium, compounds containing rare earth elements, or combinations thereof.

According to some embodiments, the at least one rare earth element compound includes particles having an equivalent spherical diameter of less than about 325 microns. In other embodiments, the at least one rare earth element compound includes particles having an equivalent spherical diameter of less than about 5 microns. In still other embodiments, the at least one rare earth element compound includes particles having an equivalent spherical diameter of less than about 1 microns. In yet other embodiments, the at least one rare earth element compound includes particles having an equivalent spherical diameter ranging from about 1 micron to about 0.05 micron.

According to some embodiments, the rare earth element compound is a rare earth element oxide. For example, the rare earth element compound may include at least one of $La_2O_3$, $CeO_2$, $Nd_2O_3$, and/or $Y_2O_3$. The rare earth element compound may include $La_2O_3$ from greater than 0% by weight to about 8.0% by weight, for example, from about 0.1% by weight to about 5.0% by weight, or from 0.2% by weight to about 4.0% by weight. The rare earth element compound may include $CeO_2$ from greater than 0% by weight to about 5.0% by weight, for example, from about 0.1% by weight to about 4.5% by weight, or from 0.3% by weight to about 4.0% by weight. The rare earth element compound may include $Nd_2O_3$ from greater than 0% by weight to about 2.0% by weight, for example, from about 0.1% by weight to about 1.5% by weight, or from 0.2% by weight to about 1.0% by weight. The rare earth element compound may include $Y_2O_3$ from greater than 0% by weight to about 0.2% by weight, for example, from about 0.001% by weight to about 0.2% by weight, or from 0.01% by weight to about 0.2% by weight.

According to some embodiments, the deflocculated layer may include up to about 8.0% by weight of $La_2O_3$, up to about 4.0% by weight of $CeO_2$, up to about 1.0% by weight of $Nd_2O_3$, and up to about 0.2% by weight of $Y_2O_3$. For example, the deflocculated layer may include up to about 4.0% by weight of $La_2O_3$, up to about 4.0% by weight of $CeO_2$, up to about 1.0% by weight of $Nd_2O_3$, and up to about 0.1% by weight of $Y_2O_3$. The deflocculated layer may be processed to remove kaolin and/or chemical salts.

According to some embodiments, the kaolinite underflow product obtained from the method described herein may have the following product properties: the percent residual $TiO_2$ may be less than about 0.7% by weight (based on the dry weight of kaolinite product). According to some embodiments, the described method may be effective in treating kaolinite-containing inorganic particulate materials having a wide range of particle size properties. It may be particularly suitable for producing fine materials suitable for use, for example, as pigments in paper products. For example, the product produced may have the following properties: mean particle size from about 0.2 micron to about 5 microns (e.g., from about 0.2 micron to about 1.5 microns); percentage (by weight) of particles having a size less than 2 microns of at least about 60% (e.g., at least about 80% by weight or at least about least 90% by weight). For the purpose of this application, chemical analysis were performed using a SIEMEMS SRS3000 wavelength dispersive X-ray Florescence Spectrometer (XRF) and results are reported as weight percent (wt. %) elemental oxide. Samples for XRF analysis containing particles greater than 200 mesh (74 microns) are ground using a SpectroMill Ball Pestle Impact Grinder or other appropriate mill. The dry powder is weighed and accurately mixed with Chemplex X-Ray Mix Powder (binding aid) to form a dry blend containing 90% sample powder and 10% binding aid. The blend is mixed for five minutes using a SpectroMill Ball Pestle Impact Grinder and then pressed into pellets using Spex 3624B Hydraulic Press set to twenty tons pressure.

For the purpose of this application, the particle size distribution measurements (equivalent spherical diameter) and mean size measurements reported are as measured in a well-known manner by sedimentation of a fully-dispersed suspension of the particles diluted to 10% solids in a standard aqueous medium of deionized water and assayed using a SEDIGRAPH® 5100 machine supplied by Micromeritics Corporation. The sample presented for particle size analysis has already been screened through a 325 mesh to remove grit and residue particles greater than about 44 um particles. The SediGraph results report the PSD of the degritted sample free of residue.

In the following description with reference to FIG. 1, percentage by weight values given for additives are, unless otherwise stated, percentages by weight of dry or active amounts of the additives based on the dry weight of the inorganic particulate material present in the treated suspension.

In the exemplary embodiment shown in FIG. 1, particulate material containing kaolinite and rare earth element compounds, for example, crude, particulate kaolin obtained near the Capim River (Rio Capim) in Brazil, is delivered as a substantially dry solid material from a source 1, together with water from a source 2, to a blunger 3. An aqueous suspension having a solids content of at least about 30% (e.g., from about 40% to about 70% or more by weight) is formed in the blunger 3. One or more of the following materials are also added to the suspension being treated in the blunger 3: (a) inorganic dispersant (e.g., sodium hexametaphosphate) from a source 4; (b) alkali (e.g., sodium hydroxide or sodium carbonate) from a source 5; and (c) organic polyelectrolyte dispersant (e.g., sodium polyacrylate) from a source 6.

The materials from the sources 1, 2, 4, 5 and 6 are thoroughly mixed and worked together in the blunger 3. Mechanical working of the aqueous suspension of kaolin in the blunger 3 is applied to break down agglomerates of solid particles. The resulting dispersed suspension has a pH of about 6.5 to about 7. An output stream 7 including the dispersed suspension after treatment in the blunger 3 may be supplied (e.g., after dilution with water) from a source 8 to a degritter 9, where large particles are separated and removed.

Conditioning chemical (e.g., a sodium halide and/or a sodium polyacrylate) may be added from a source 10. The degritted kaolin suspension is then delivered to a conditioning tank 11, where the suspension is allowed to stand with gentle mechanical stirring for an ageing period (e.g., for at least 30 minutes, or for several hours or days).

After conditioning by ageing, further optional conditioning chemical may be added (i.e., in addition to or instead of that applied prior to ageing) from the chemical additive source 10. Thereafter, the suspension is delivered to a mixer 12. The suspension may be diluted by addition of water from a source 13 to adjust the specific gravity of the suspension. The pH of the suspension is adjusted to be at least about 9.5 by addition of alkali, such as, for example, sodium hydroxide or sodium carbonate, from a source 14.

An output stream from the mixer 12 includes the particulate suspension and additives having a low solids concentration of, for example, from about 10% to about 15% by weight, and a pH of at least about 9.5. The suspension may be passed through a heater 15 (e.g., a heat exchanger), which heats the suspension to a temperature ranging from about 30° C. to about 40° C.

Thereafter, a stream of the suspension is delivered to a mixer 17, where selective flocculation polymer consisting of a high molecular weight polyacrylamide having less than about 15% by weight of anionic groups is added from a source 16. The output of the mixer 17 is a stream 18 of the suspension, which is delivered as a feed, to a separator 19, in which separation of kaolinite from rare earth element compounds and/or impurities by selective flocculation occurs. Following this separation, a flocculated underflow layer 20 and a deflocculated overflow layer 21 are formed. A kaolinite-containing product stream 23 from the underflow layer 20 including beneficiated kaolinite flocs is collected from the separator 19 at its base 22. A stream 24 including the deflocculated layer, which includes rare earth element compounds and/or impurities, separated by the selective flocculation process in the overflow layer 21 is extracted from an upper region of the separator 19, as the deflocculated layer containing the rare earth element compounds and impurities rises to the top of the separated layers.

The stream 23 containing the flocculated suspension containing kaolinite is passed (e.g., after shearing of the flocs therein by a shearing device 25) through an ozonizer 27, in which ozone gas is applied thereto. The concentration of ozone applied may range from, for example, about 0.01% to about 0.05% by weight. The ozone breaks down residual polymer and other oxidizable impurities (e.g., organic coloring contaminants) present in the suspension. An output stream 28 from the ozonizer 27 is delivered to a plant 29, in which the beneficiated kaolinite containing suspension may be further treated by conventional processing steps as described earlier to produce a commercially acceptable pigment product 30 available in dry or slurry form as desired (e.g., having the properties described earlier).

The deflocculated (overflow) layer may optionally be further processed or dewatered. Further processing may include (a) returning a portion of the overflow layer to dilute the incoming feed in place of a portion of water from source 13; (b) adding additional high molecular weight polymer to flocculate kaolinite and separate the flocculated kaolinite layer to further concentrate the rare earth containing compounds in the unflocculated (overflow) suspension; (c) performing flotation using a variety of reagents to create a froth with air bubbles, collect phosphate-bearing and/or rare earth bearing particles onto the bubbles, and suppress the collection of silicate-bearing and/or kaolinite particles on the bubbles, and remove the phosphate and/or rare earth-bearing froth; or (d) performing flotation using a variety of reagents to create a froth with air bubbles, collect silicate-bearing, titania-bearing, and/or kaolinite particles onto the bubbles, suppress the collection of phosphate or rare earth-bearing particles onto bubbles, and separate the froth from the phosphate and/or rare-earth-bearing pulp.

According to some embodiments, the rare earth element compound may be a rare earth element oxide. For example, the rare earth element compound may be at least one of $La_2O_3$, $CeO_2$, $Nd_2O_3$, and/or $Y_2O_3$. For example, the rare earth element compound may include $La_2O_3$ from greater than 0% by weight to about 8.0% by weight, for example, from about 0.1% by weight to about 5.0% by weight, or from 0.2% by weight to about 4.0% by weight. The rare earth element compound may include $CeO_2$ from greater than 0% by weight to about 5.0% by weight, for example, from about 0.1% by weight to about 4.5% by weight, or from 0.3% by weight to about 4.0% by weight. The rare earth element compound may include $Nd_2O_3$ from greater than 0% by weight to about 2.0% by weight, for example, from about 0.1% by weight to about 1.5% by weight, or from 0.2% by weight to about 1.0% by weight. The rare earth element compound may include $Y_2O_3$ from greater than 0% by weight to about 0.2% by weight, for example, from about 0.001% by weight to about 0.2% by weight, or from 0.01% by weight to about 0.2% by weight.

According to some embodiments, the deflocculated layer may include up to about 8.0% by weight of $La_2O_3$, up to about 4.0% by weight of $CeO_2$, up to about 1.0% by weight of $Nd_2O_3$, and up to about 0.2% by weight of $Y_2O_3$.

According to some embodiments, the deflocculated layer may include up to about 4.0% by weight of $La_2O_3$, up to about 4.0% by weight of $CeO_2$, up to about 1.0% by weight of $Nd_2O_3$, and up to about 0.1% by weight of $Y_2O_3$.

The rare earth oxides in the deflocculated layer may be further concentrated and recovered using such suitable rare earth concentration and recovery methods that would be known to one of ordinary skill in the art. For example, the deflocculated layer may be subjected to solvent extraction, acid extraction, or supercritical fluid extraction. The deflocculated layer may also be processed to remove kaolin and/or chemical salts.

The process of floating out phosphates and rare earth containing particles may be an effective way to increase phosphate mineral and rare earth containing compound concentration from a range of about 1 wt. % to 10 wt. % to a range of about 20 wt. % to 90 wt. % and raise solids from less than about 1% to less than about 10%.

Following the optional processing of the unflocculated (overflow) suspension, the phosphate and/or rare earth bearing minerals and/or compounds need to be dewatered to increase solids concentration. Several processes could be used to concentrate solids such as the use of membrane filters, polishing filters, disc nozzle centrifuges. The addition of chemicals to coagulate and flocculate the phosphate and/or rare earth bearing minerals and/or compounds will improve the performance of some of these dewatering technologies and will enable other filter systems such as rotary vacuum filters and thickeners to be used for increasing pulp solids and form a cake that can be more easily handled and transported than low solids pulp.

Three examples of yields from the treatment of suspensions or slurries of particulate material containing kaolinite and rare earth element compounds are provided below, with the yields being obtained by exemplary embodiments of the method described herein. In each of these examples, a percentage value of the listed materials obtained is stated as a percentage by weight on a dry or active basis based on the dry weight of particulate material present in the slurry.

Example 1

In Example 1, the feed material was a cream-colored, crude kaolin particulate material containing kaolinite, rare earth element compounds, and impurities such as anatase. An exemplary embodiment of the method described above was carried out as follows:

The crude was blunged using 3 #/dst (dry short ton) sodium polyacrylate (Acumer 9400) and pH was adjusted to between 6 and 6.5 using sodium hydroxide. The resulting mineral-water slip was degritted through a 325 mesh screen to yield on a dry basis 8.9 lbs of degritted clay that was used as the feed material. The feed material was then diluted to 10% solids with 1.6 lbs/ton (active-dry short) of high molecular weight polymer 0.075% solution (HYPERFLOC AF359) with pH adjusted to 11.5 with NaOH, stirred 30 seconds, and allowed to settle in a 12" diameter×12" tall cylinder that resulting in a 0.6"/sec floc settling rate and unflocculated supernatant having a specific gravity of 1.002 measured by hydrometer.

The unflocculated supernatant (overflow) is less than about 1% solids and needs to be dewatered for further processing into rare earth metals and/or for ease of handling. The supernatant is clarified using about 15 #/dst alum ("as received" dry basis) and enough sulfuric acid to drop the supernatant pH to about 3. The clarification is completed with the addition of 210 ppm (dry-dry) high molecular weight polymer (HYPERFLOC AF 359) and allowed to settle overnight. The resulting settled solids are then dried and measured for elemental content.

Table 1 below shows the materials obtained by performance of the method described above for the feed of Example 1. The rare earth element compounds obtained (i.e., the rare earth element oxides) were present in the deflocculated overflow layer (i.e., the upper layer of the separated layers).

Example 2

In Example 2, the feed material was a kaolinitic sand containing kaolinite, rare earth element compounds, and impurities. The exemplary method described above with respect to Example 1 was carried out to treat the feed material of Example 2. Table 1 below shows the materials obtained by performance of the method described above for the feed material of Example 2. The rare earth element compounds obtained were present in the deflocculated overflow layer.

Example 3

In Example 3, the feed material was a crude composite particulate material containing kaolinite, rare earth element compounds, and impurities. The exemplary method described above with respect to Example 1 was carried out to treat the feed material of Example 3. Table 1 below shows the materials obtained by performance of the method described above for the feed material of Example 3. The rare earth element compounds obtained were present in the deflocculated overflow layer.

Example 4

In Example 4, the feed material was a soft clay particulate material containing kaolinite, rare earth element compounds, and impurities such as anatase. An exemplary embodiment of the method described above was carried out as follows:

The crude was blunged using 3 #/dst (dry short ton) sodium polyacrylate (Acumer 9400) and pH was adjusted to between 6 and 6.5 using sodium hydroxide. The resulting mineral-water slip was degritted through a 325 mesh screen. The degritted slurry material was then diluted to 10% solids with 1.8 lbs/ton (active-dry short) of high molecular weight polymer 0.075% solution (HYPERFLOC AF359) with pH adjusted to 11.5 with NaOH, stirred 30 seconds, and allowed to settle in a 12" diameter×12" tall cylinder that resulting in a 0.4"/sec floc settling rate and unflocculated supernatant having a specific gravity of 1.002 measured by hydrometer. This separation resulted in 4.8% of the dry solids being collected in the unflocculated overflow and 95.2% of the dry solids being discarded in the flocculated underflow.

The unflocculated supernatant (overflow) is less than about 1% solids and needs to be dewatered for further processing into rare earth metals and/or for ease of handling. The supernatant is clarified using about 15 #/dst alum ("as received" dry basis) and enough sulfuric acid to drop the supernatant pH to about 3. The clarification is completed with the addition of 10 #/dst (dry-dry) high molecular weight polymer (HYPERFLOC AF 359) and allowed to settle overnight. The resulting settled solids are then dried and measured for elemental content.

Table 2 below shows the processed materials obtained by performance of the method described above for the feed of Example 4 in comparison to the values in the unprocessed blunged feed. The rare earth element compounds obtained (i.e., the rare earth element oxides) were present in the deflocculated overflow layer (i.e., the upper layer of the separated layers).

Example 5

In Example 5, the feed material was a "hard clay" particulate material containing kaolinite, rare earth element compounds, and impurities such as anatase. An exemplary embodiment of the method described above was carried out as follows:

The crude was blunged using 4 #/dst (dry short ton) sodium polyacrylate (Kemira, C211) and 8 #/dst sodium hexametaphosphate, pH was adjusted to between 6.5 and 7.5 using sodium hydroxide. The resulting mineral-water slip was degritted through a 325 mesh screen and classified to 95% less than 2 microns in a lab scale centrifuge. The classified material was then diluted to 10% solids with 1.6 lbs/ton (active-dry short) of high molecular weight polymer 0.075% solution (HYPERFLOC AF359) with pH adjusted to 11.5 with NaOH, stirred 30 seconds, and allowed to settle in a 12" diameter×12" tall cylinder that resulting in a 0.6"/sec floc settling rate and unflocculated supernatant having a specific gravity of 1.002 measured by hydrometer.

The unflocculated supernatant (overflow) is less than about 1% solids and needs to be dewatered for further processing into rare earth metals and/or for ease of handling. The supernatant is clarified using about 15 #/dst alum ("as received" dry basis) and enough sulfuric acid to drop the supernatant pH to about 3. The clarification is completed with the addition of 210 ppm (dry-dry) high molecular weight polymer (HYPERFLOC AF 359) and allowed to settle overnight. The resulting settled solids are then dried and measured for elemental content.

Table 2 below shows the processed materials obtained by performance of the method described above for the feed of Example 5, in comparison to the values in the unprocessed blunged feed. The rare earth element compounds obtained (i.e., the rare earth element oxides) were present in the deflocculated overflow layer (i.e., the upper layer of the separated layers).

TABLE 1

|  | Example 1 Cream to Grey-colored crude | Example 2 Kaolinitic Sand | Example 3 Crude Composite |
|---|---|---|---|
| Major Elements |  |  | 31 |
| $SiO_2$ | 14.8 | 39.6 | 37.4 |
| $Al_2O_3$ | 24.3 | 34.8 | 33.4 |
| $TiO_2$ | 30.0 | 5.5 | 8.4 |
| $Fe_2O_3$ | 1.7 | 0.6 | 1.1 |
| MgO | n.d. | n.d. | n.d. |
| CaO | 0.2 | n.d. | 0.2 |
| $Na_2O$ | n.d. | 0.6 | 1.3 |
| $K_2O$ | 0.1 | 0.1 | n.d. |
| $P_2O_5$ | 6.1 | 0.8 | 1.5 |
| Total rare earth element oxides | 5.1 | 0.7 | 1.1 |
| $H_2O$ | 12.8 | 15.9 | 14.9 |
| Total | 95.2 wt. % | 98.5 wt. % | 99.3 wt. % |
| Rare earth element oxides |  |  |  |
| $Y_2O_3$ | 0.05 | 0.01 | 0.01 |
| $La_2O_3$ | 1.67 | 0.21 | 0.37 |

TABLE 1-continued

| | Example 1 Cream to Grey-colored crude | Example 2 Kaolinitic Sand | Example 3 Crude Composite |
|---|---|---|---|
| $CeO_2$ | 2.65 | 0.36 | 0.53 |
| $PrO_2$ | 0.22 | n.d. | n.d. |
| $Nd_2O_3$ | 0.55 | 0.10 | 0.18 |
| Total | 5.14 wt. % | 0.68 wt. % | 1.09 wt. % |

Table 1 shows that significant amounts of rare earth element compounds may be obtained according to the above-referenced exemplary embodiment of the method disclosed herein for obtaining rare earth element compositions from a particulate material containing kaolinite and rare earth element compounds. In addition, the inventors have surprisingly found that rare earth element compounds separate from the flocculated kaolinite layer as part of the deflocculated overflow layer (i.e., upper layer) of the layers in the selective flocculation separator. The inventors have also surprisingly found that the rare earth element compounds take the form of particles having an equivalent spherical diameter of less than about 325 microns. In addition, impurities were also separated from the flocculated kaolinite layer and were present in the deflocculated layer.

TABLE 2

| | Example 4 Soft Clay Blunged Crude | Example 4 Soft Clay Selective Floc Overflow | Example 5 Hard Clay Blunged Crude | Example 5 Hard Clay Selective Floc Overflow |
|---|---|---|---|---|
| Major Elements | | | | |
| $SiO_2$ | 45.2 | 26.9 | 45.0 | 37.1 |
| $Al_2O_3$ | 38.0 | 26.8 | 38.8 | 35.7 |
| $TiO_2$ | 1.7 | 27.8 | 1.8 | 8.1 |
| $Fe_2O_3$ | 1.0 | 1.8 | 0.5 | 1.7 |
| MgO | n.d. | n.d. | n.d. | n.d. |
| CaO | n.d. | 0.1 | 0.1 | 0.1 |
| $Na_2O$ | n.d. | n.d. | n.d. | n.d. |
| $K_2O$ | 0.1 | 0.1 | n.d. | n.d. |
| $P_2O_5$ | n.d. | 2.2 | 0.1 | 1.2 |
| Total rare earth element oxides | n.d. | 1.9 | <0.1 | 0.8 |
| $H_2O$ | 13.9 | 10.5 | 13.1 | 14.5 |
| Total | 99.9 wt. % | 98.1 wt. % | 99.4 wt. % | 99.2 wt. % |
| Rare earth element oxides | | | | |
| $Y_2O_3$ | n.d. | 0.06 | 0.006 | 0.01 |
| $La_2O_3$ | n.d. | 0.65 | n.d. | 0.21 |
| $CeO_2$ | n.d. | 0.91 | n.d. | 0.45 |
| $PrO_2$ | n.d. | n.d. | n.d. | n.d. |
| $Nd_2O_3$ | n.d. | 0.26 | 0.006 | 0.12 |
| Total | n.d. | 1.88 wt. % | 0.01 wt. % | 0.79 wt. % |

Table 2 shows that low levels of rare earth element compounds in the feed material may be greatly enriched using the above-referenced exemplary embodiments of the method disclosed herein for obtaining rare earth element compositions from a particulate material containing kaolinite and rare earth element compounds.

In addition, the inventors have surprisingly found that rare earth element compounds separate from the flocculated kaolinite layer as part of the deflocculated overflow layer (i.e., upper layer) of the layers in the selective flocculation separator. The inventors have also surprisingly found that the rare earth element compounds take the form of particles having an equivalent spherical diameter of less than about 325 microns. In addition, impurities were also separated from the flocculated kaolinite layer and were present in the deflocculated layer. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method, comprising:
   providing a dispersed aqueous suspension of a particulate material comprising at least one rare earth element compound and kaolinite;
   adding to the suspension a selective flocculation polymer that facilitates separation of at least a portion of the at least one rare earth element compound from the kaolinite by flocculating the kaolinite and allowing particles comprising the at least one rare earth element compound to be or remain deflocculated;
   allowing the suspension containing the polymer to separate in a selective flocculation separator into layers comprising a flocculated product layer and a deflocculated layer containing the portion of the at least one rare earth element compound; and
   extracting the deflocculated layer from the separator.

2. The method of claim 1, wherein the deflocculated layer is an overflow layer.

3. The method of claim 1, wherein the particles comprising the at least one rare earth element compound have an equivalent spherical diameter of less than about 325 µm.

4. The method of claim 1, wherein the particles comprising the at least one rare earth element compound have an equivalent spherical diameter of less than about 1 µm.

5. The method of claim 1, wherein the particulate material comprises or is obtained from kaolin.

6. The method of claim 1, wherein the particulate material comprises or is obtained from sedimentary kaolin.

7. The method of claim 1, wherein providing the dispersed aqueous suspension of the particulate material comprises adding water and a dispersing agent to a substantially dry, crude kaolin.

8. The method of claim 1, wherein the specific gravity of the deflocculated layer containing the portion of the at least one rare earth element compound is greater than about 1.0005.

9. The method of claim 1, wherein the specific gravity of the deflocculated layer containing the portion of the at least one rare earth element compound ranges from about 1.0005 to about 1.02.

10. The method of claim 1, wherein the specific gravity of the deflocculated layer containing the portion of the at least one rare earth element compound ranges from about 1.001 to about 1.003.

11. The method of claim 1, wherein the selective flocculation polymer comprises a polymer having a molecular weight greater than about one million.

12. The method of claim 1, wherein the selective flocculation polymer comprises a weakly anionic organic polymer having a molecular weight greater than about 100,000.

13. The method of claim 1, further comprising separating at least a portion of the at least one rare earth element compound from the deflocculated layer.

14. The method of claim 13, wherein the separating of the at least one rare earth element compound from the deflocculated layer includes concentration by solvent extraction or acid extraction.

15. The method of claim 13, wherein the separating of the at least one rare earth element compound from the deflocculated layer includes concentration by supercritical fluid extraction.

16. The method of claim 1, further comprising:
adding a second flocculation polymer to the deflocculated layer to form a flocculated layer and a second deflocculated layer containing the at least one rare earth element compound, wherein the second flocculation polymer is the same or different than the selective flocculation polymer; and
extracting the at least one rare earth element compound from the second deflocculated layer.

17. A method for preparing a rare earth element composition, the method comprising:
adding a flocculation polymer to an aqueous suspension comprising kaolinite and at least one rare earth element compound to form a flocculated layer comprising the kaolinite and a deflocculated layer comprising the at least one rare earth element; and
extracting the at least one rare earth element compound from the deflocculated layer;
wherein the at least one rare earth element comprises lanthanum, cerium, yttrium, neodymium, or a combination thereof.

18. The method of claim 16, wherein the at least one rare earth element compound comprises $La_2O_3$, $CeO_2$, $Nd_3O_3$, or $Y_2O_3$.

* * * * *